(12) United States Patent
Lichoulas et al.

(10) Patent No.: US 9,703,051 B2
(45) Date of Patent: Jul. 11, 2017

(54) CONNECTOR HOUSING WITH PRESS FIT BOOT SEAL

(71) Applicant: AFL Telecommunications LLC, Duncan, SC (US)

(72) Inventors: Ted Lichoulas, Dacula, GA (US); Eddie Kimbrell, Dacula, GA (US)

(73) Assignee: AFL Telecommunications LLC, Duncan, SC (US)

( * ) Notice: Subject to any disclaimer, the term of this patent is extended or adjusted under 35 U.S.C. 154(b) by 71 days.

(21) Appl. No.: 14/426,490

(22) PCT Filed: Sep. 6, 2013

(86) PCT No.: PCT/US2013/058497
§ 371 (c)(1),
(2) Date: Mar. 6, 2015

(87) PCT Pub. No.: WO2014/039812
PCT Pub. Date: Mar. 13, 2014

(65) Prior Publication Data
US 2015/0212284 A1    Jul. 30, 2015

Related U.S. Application Data

(60) Provisional application No. 61/708,977, filed on Oct. 2, 2012, provisional application No. 61/697,532, filed on Sep. 6, 2012.

(51) Int. Cl.
*G02B 6/38* (2006.01)
*G02B 6/44* (2006.01)

(52) U.S. Cl.
CPC ......... *G02B 6/3894* (2013.01); *G02B 6/3825* (2013.01); *G02B 6/3846* (2013.01); *G02B 6/3887* (2013.01); *G02B 6/4478* (2013.01)

(58) Field of Classification Search
None
See application file for complete search history.

(56) References Cited

U.S. PATENT DOCUMENTS 7,281,856 B2 * 10/2007 Grzegorzewska ... G02B 6/3816
385/53
2007/0031103 A1   2/2007 Tinucci et al.
(Continued)

OTHER PUBLICATIONS

International Search Report of PCT/US2013/058497 dated Feb. 7, 2014 [PCT/ISA/210].
(Continued)

*Primary Examiner* — Tina Wong
(74) *Attorney, Agent, or Firm* — Dority & Manning, P.A.

(57) ABSTRACT

A connector housing apparatus for allowing field engineers or technicians to run cable point to point, and to protect the connection in an environmentally sealed, crush resistant housing is provided. The connector housing apparatus includes a connector housing body, two sealing boots, two sealing elements, a fiber optic adapter, a fiber optic adapter insert that holds the fiber optic adapter and two fiber optic pigtails connected to two fiber optic cables. Each boot has two seal points. The first seal is between the fiber optic cable, the sealing element, and the tapered portion of the sealing boot. The second seal is between the interference lip on the sealing boot and the interference lip on the connector housing body.

18 Claims, 13 Drawing Sheets

(56) References Cited

U.S. PATENT DOCUMENTS

| | | |
|---|---|---|
| 2007/0036487 A1 | 2/2007 | Grzegorzewska et al. |
| 2007/0215663 A1 | 9/2007 | Chongson et al. |
| 2009/0162016 A1 | 6/2009 | Lu et al. |
| 2012/0174378 A1 | 7/2012 | Ringgenberg et al. |

OTHER PUBLICATIONS

Written Opinion of PCT/US2013/058497 dated Feb. 7, 2014 [PCT/ISA/237].

* cited by examiner

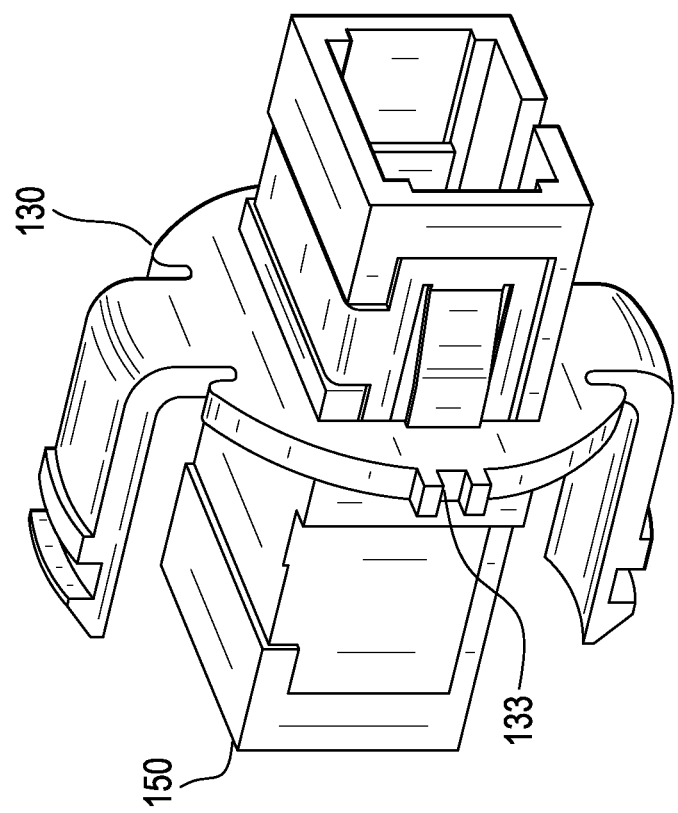

CONNECTOR HOUSING WITH PRESS FIT BOOT SEAL

CROSS-REFERENCE TO RELATED APPLICATIONS

This application is based upon and claims the benefit of priority from U.S. Provisional Application No. 61/697,532, filed Sep. 6, 2012 and from U.S. Provisional Application No. 61/708,977, filed Oct. 2, 2012, in the United States Patent and Trademark Office, the disclosures of which are incorporated herein in its entirety by reference.

BACKGROUND

1. Field

The invention is related to a connector housing, and more particularly to a field installable connector housing comprising a press fit boot seal.

2. Related Art

The background information provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

In the Private Network and Industrial markets, there is a continuing trend where copper based communication wiring is being replaced with fiber optic cabling for communication and sensing applications. The traditional method to cable these networks is to use factory terminated harsh environment fiber optic connectors or splice enclosures to protect system interconnector points. Although these methods are reliable and well-accepted within these industries, this approach requires system designers to dedicate substantially more upfront engineering work on the layout and design of these systems. Additionally, expensive installation hardware and field technicians are needed to install these systems. Both these conditions can make fiber optic systems less attractive financially than copper based systems.

Some existing products include:

Corning Optitap—This Optitap is a factory installed hardened SC connector.

Corning Optitip—The Optitip is a factory installed MT connector.

Lcomm (distributor) offers factory installed duplex LC connectors.

It is an object of the present invention to provide a field installable outside plant connector housing with press fit boot seal that can be used to reduce the installation cost of these systems by allowing field engineers or technicians to run cable point to point, and make field installable connections as needed at the interconnect points, and protect these connection points in an environmental sealed, crush resistant housing. This approach can reduce the amount of upfront job planning needed for a particular system and allow less skilled installation personnel to complete the installation.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

According to an exemplary embodiment, a connector housing apparatus includes a connector housing body, a first sealing boot, a second sealing boot, a fiber optic adapter configured to connect to a first fiber optic pigtail and a second fiber optic pigtail, and a fiber optic adapter insert that holds the fiber optic adapter. The first sealing boot and the second sealing boot are connected to the connector body housing at opposite ends of the connector housing body.

According to another exemplary embodiment, the connector housing body further includes a first sealing element, and a second sealing element. A first fiber optic cable connected to the first fiber optic pigtail, the first sealing element and a tapered section of the first sealing boot form a first seal, and a second fiber optic cable connected to the second fiber optic pigtail, the second sealing element and a tapered section of the second sealing boot form a second seal.

According to another exemplary embodiment, the connector housing body includes a first interface lip and a second interface lip at its opposite ends. The first sealing boot includes an interface lip, the second sealing boot includes an interface lip, the first interface lip of the connecter housing body and the interface lip of the first sealing boot are connected form a third seal, and the second interface lip of the connecter housing body and the interface lip of the second sealing boot are connected form a fourth seal.

According to another exemplary embodiment, the connector housing body includes a first snap finger and a second snap finger at its opposite ends. The first sealing boot comprises a snap fit receiving catch, the second sealing boot comprises a snap fit receiving catch, the first snap finger of the connecter housing body and the snap fit receiving catch of the first sealing boot are connected to form a third seal, and the second snap finger of the connecter housing body and the snap fit receiving catch of the second sealing boot are connected to form a fourth seal.

According to another exemplary embodiment, the connector housing body includes a connector housing body shoulder and connector housing body threads allowing for installation of the connector housing apparatus on an enclosure.

According to another exemplary embodiment, the connector housing apparatus also includes a locking nut. When the first sealing boot is removed, the connector housing apparatus can be mounted onto an exterior surface of the enclosure using the locking nut.

According to another exemplary embodiment, the fiber optic adapter insert includes a depression on its surface which snaps into a protrusion on the inner surface of the connector housing body.

According to another exemplary embodiment, the fiber optic adapter insert includes a cutout which can be modified to accommodate a variety of fiber optic adapters, the fiber optic adapter insert cutout can be modified to accommodate one or more adapters, and the fiber optic adapter insert includes an anti rotation key section which locks with a linear rib molded into inner bore of the connector housing body.

According to another exemplary embodiment, the variety of fiber optic adapters includes one of simplex FC, simplex ST, simplex LC, simplex SC, simplex MU, duplex LC, duplex MU, and MPO/MTP adapters.

According to another exemplary embodiment, the tapered section of the first sealing boot and the tapered section of the second sealing boot include line markings allowing for a user to size the opening of the first sealing boot and the second sealing boot according to the diameter of the first fiber optic cable and the second fiber optic cable respectively.

According to another exemplary embodiment, the first sealing element and the second sealing element are at least one of b-sealing tape, closed cell foam tape, compressible elastomer and molded grommet.

According to another exemplary embodiment, the first sealing boot forms a seal which protects against the effect of immersion in water to a depth of up to 1 m, and the second sealing boot forms a seal which protects against the effect of immersion in water to a depth of up to 1 m.

According to another exemplary embodiment, the connector housing body shoulder and the connector housing body are sized to fit National Pipe Taper (NPT) port sizes.

According to another exemplary embodiment, the first fiber optic pigtail includes a fiber optic connector body and a fiber optic connector boot, the second fiber optic pigtail includes a fiber optic connector body and a fiber optic connector boot, and the fiber optic connector body of the first fiber optic pigtail and the fiber optic connector body of the second fiber optic pigtail are connected with the fiber optic adapter.

According to another exemplary embodiment, the connector housing apparatus further includes a first O-Ring, and a second O-Ring. The connector housing body includes a first groove which holds the first O-Ring and a second groove which holds the second O-Ring. When the first sealing boot is connected to the connector housing body, the first sealing boot, the first O-Ring and the connector housing body form a seal, and when the second sealing boot is connected to the connector housing body, the second sealing boot, the second O-Ring and the connector housing body form a seal.

According to another exemplary embodiment, the connector housing apparatus further includes a first O-Ring, and a second O-Ring. The first sealing boot comprises a first groove on its interior surface which holds the first O-Ring, the second sealing boot comprises a second groove on its interior surface which holds the second O-Ring. When the first sealing boot is connected to the connector housing body, the first sealing boot, the first O-Ring and the connector housing body form a seal, and when the second sealing boot is connected to the connector housing body, the second sealing boot, the second O-Ring and the connector housing body form a seal.

According to another exemplary embodiment, the connector housing apparatus can be disassembled and reassembled.

According to another exemplary embodiment, the connector housing apparatus can be mounted to a bulkhead in at least one of a single and gang mounted manner.

BRIEF DESCRIPTION OF THE DRAWING

FIG. 6 shows the detail of fiber optic adapter and fiber optic adapter insert according to an exemplary embodiment of the invention.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

The terms used in the description are intended to describe embodiments only, and shall by no means be restrictive. Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1:
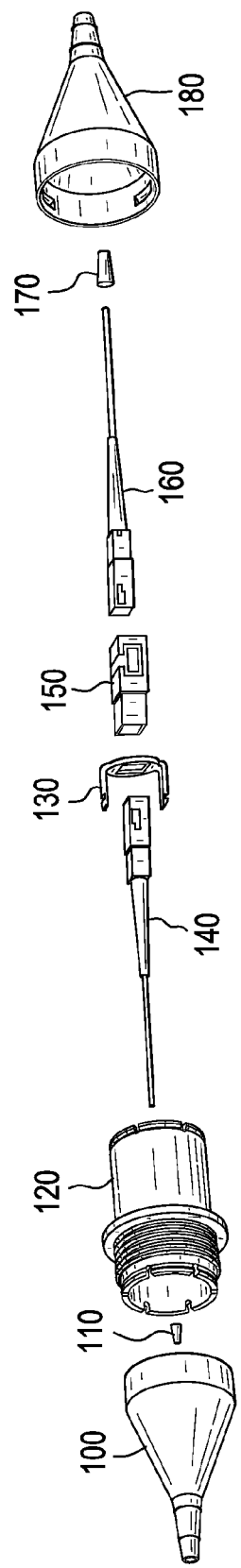
FIG. 1 is an exploded view of an exemplary embodiment of the invention showing two fiber optic connectors with a single adapter.

Referring to the drawings, FIG. 1 is an exploded view showing two fiber optic connectors connected with a single adapter within the housing. According to an exemplary embodiment, the connector housing apparatus includes two sealing boots (100, 180), a connector housing body 120, two sealing elements (110, 170), which may include but are not limited to a b-sealing tape, a closed cell foam tape, a compressible elastomer, or a molded grommet, a fiber optic adapter insert 130, a fiber optic adapter 150 and two fiber optic pigtails (140, 160). FIG. 1 only shows the SC fiber optic connectors for illustration purposes. Other fiber optic connectors (FC, ST, LC, MPO/MTP, etc.) could also be used. The fiber optic pigtails include the fiber optic connector body 142 and the fiber optic connector boot 143 according to an exemplary embodiment, as further described below in reference to FIG. 4.

Figure 2:
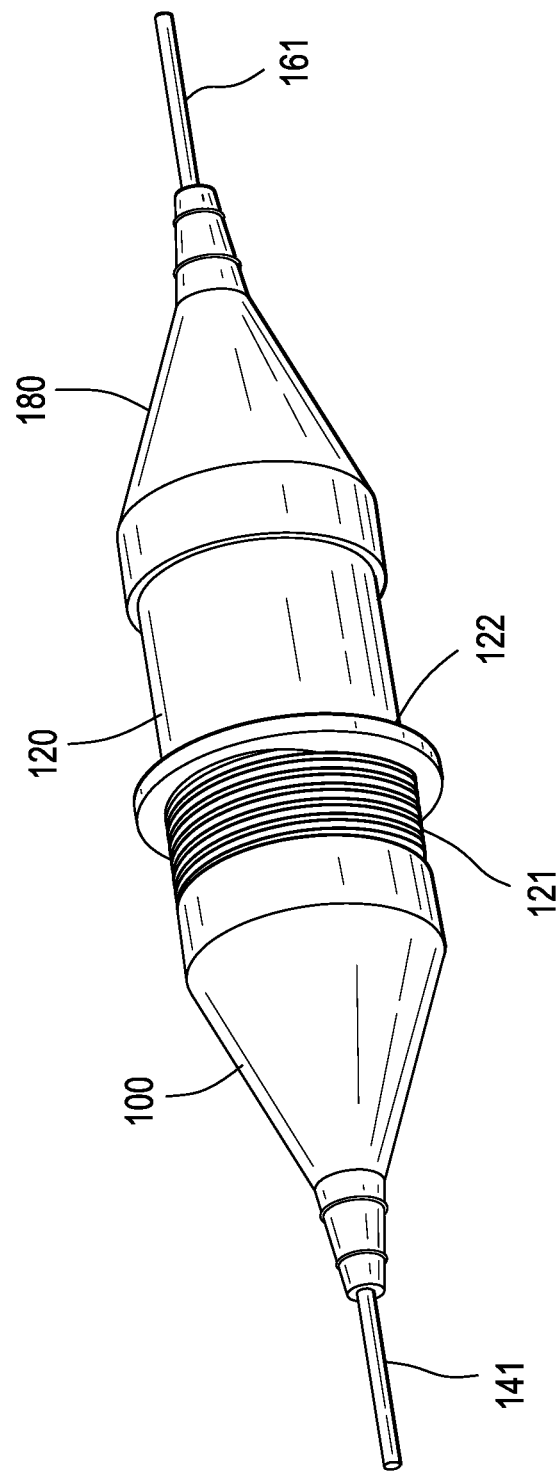
FIG. 2 is an assembled exterior view of an exemplary embodiment of the invention showing two fiber optic connectors with a single adapter within the housing.

FIG. 2 is an assembled exterior view of two fiber optic connectors with a single adapter within the housing. According to an exemplary embodiment, the two optic pigtails (140, 160) are connected to two fiber optic cables (141, 161). The connector housing body includes connector housing body threads 121 and connector housing body shoulder 122 which are used to install the connector housing on an enclosure, as described in detail below, with reference to FIG. 3.

Figure 3:
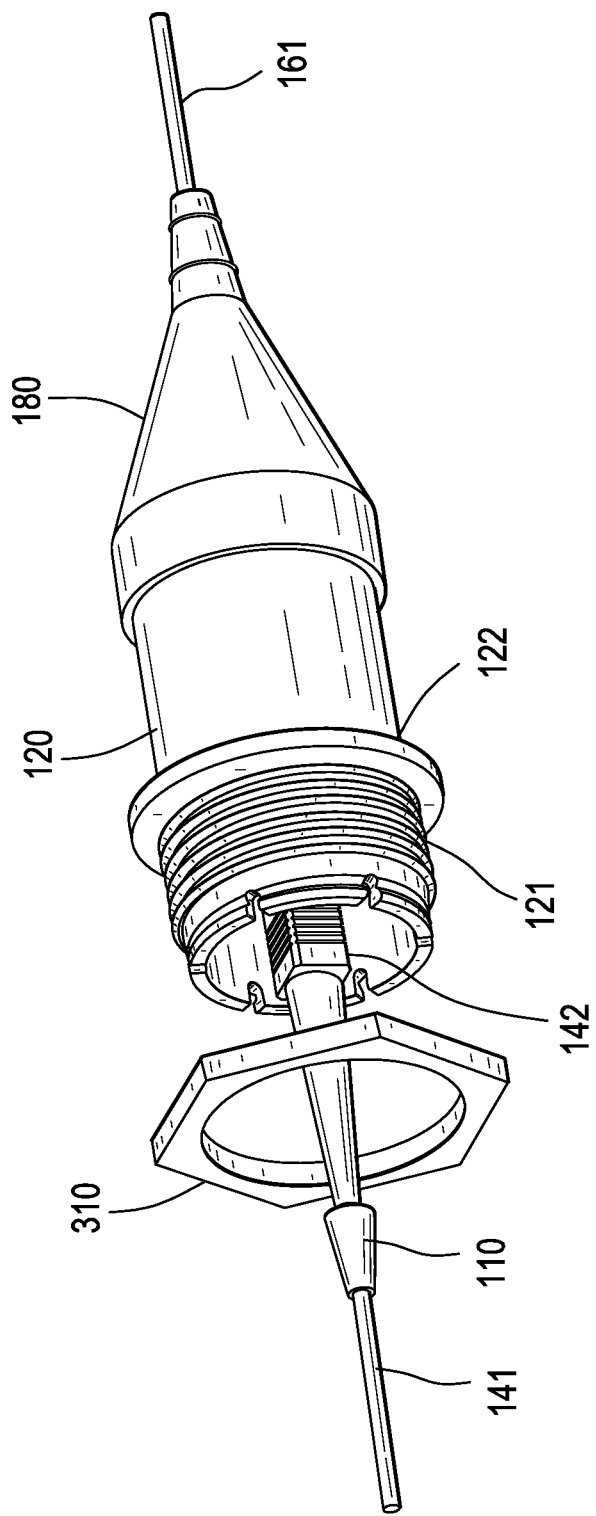
FIG. 3 is an assembled exterior view of an exemplary embodiment of the invention showing two fiber optic connectors with a single adapter within the housing with one seal boot removed, and the locking nut for enclosure mounting.

FIG. 3 is an assembled exterior view of two fiber optic connectors with a single adapter within the housing and one seal boot removed. According to an exemplary embodiment, the connector housing includes a locking nut 310. The locking nut can be used (along with the connector housing body threads 121 and the connector housing body shoulder 122) to mount the connector housing onto the exterior surface of an enclosure, providing environmentally sealed penetrations in and out of a box. The connector housing body and the connector housing body shoulder can be sized to fit National Pipe Taper (NPT) port sizes according to another exemplary embodiment. The connector housing further includes a fiber optic connector 142 which is connected to the fiber optic pigtail 140 which is in-turn connected to the cable 141.

Figure 4:
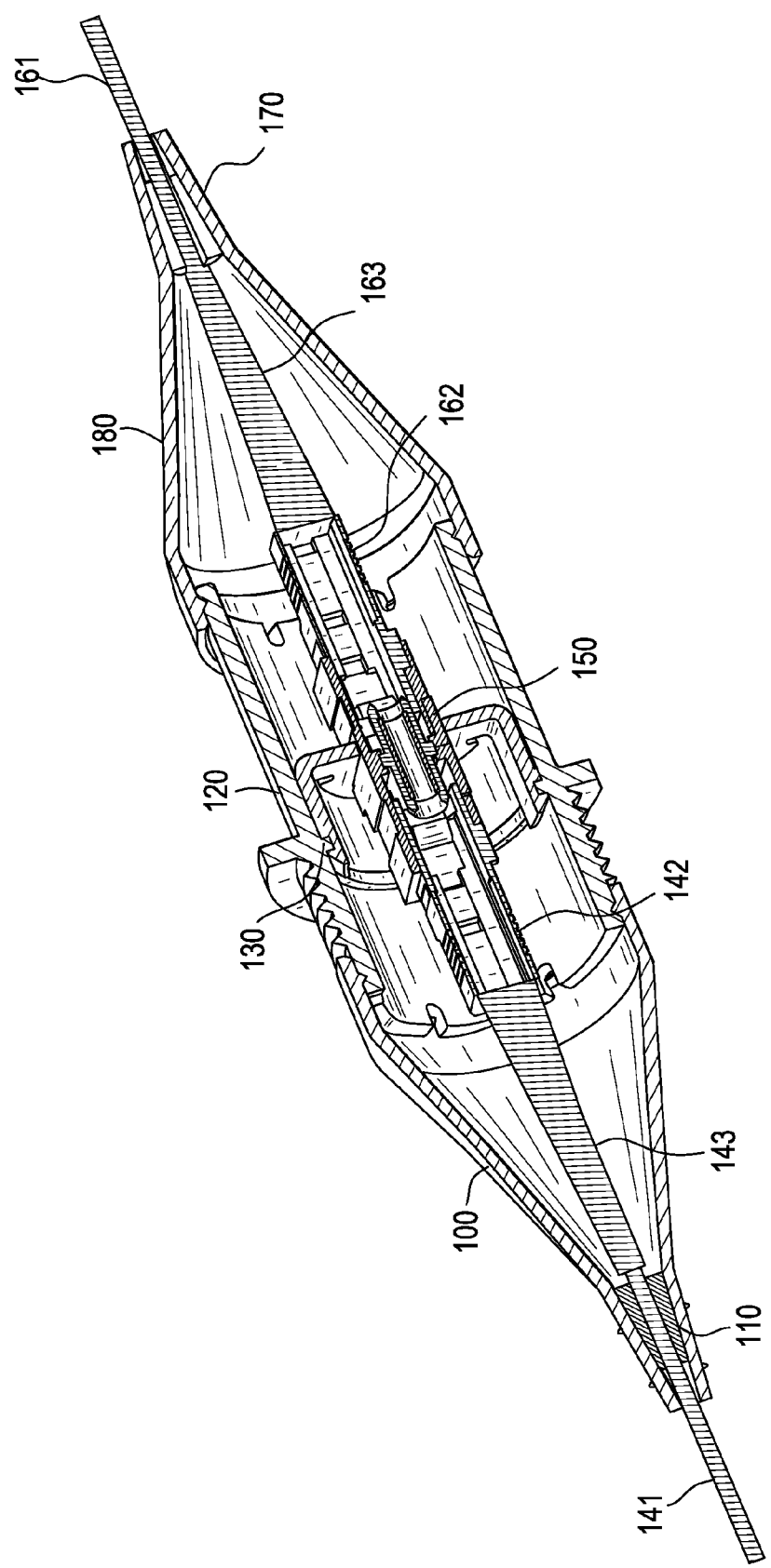
FIG. 4 is a cross sectional view of an exemplary embodiment of the invention showing two fiber optic connectors with a single adapter with the housing.

FIG. 4 is a cross sectional view of two fiber optic connectors with a single adapter with the housing. According to an exemplary embodiment, each boot has four seal points. The first seal is between the fiber optic cable 141, sealing element 110, and a taper portion of the sealing boot 100. The second seal is between the fiber optic cable 161, sealing element 170, and a taper portion of the sealing boot 180. The third and fourth seals are between the interference lip (interference lip is described in more detail below with reference to FIGS. 8 and 9) on the seal boots (100, 180) (see FIGS. 9-101, 181) and the interference lip on the connector housing body 120 (see FIG. 8-124, 125). The seals are designed to be compliant with ingress protection standards such as IP-67. For example, the seal may be designed to protect against the effect of immersion in a liquid to a depth of up to 1 m The fiber optic adapter insert 130 is designed to accept a simplex SC adapter, duplex LC adapter, or MPO/MTP adapter according to an exemplary embodiment. Different fiber optic adapter inserts can be used/interchanged in the field to accommodate the installation needed. To facilitate this need, tabs or fingers can be installed to the fiber optic adapter insert to facilitate removal in the field.

Figure 5A:
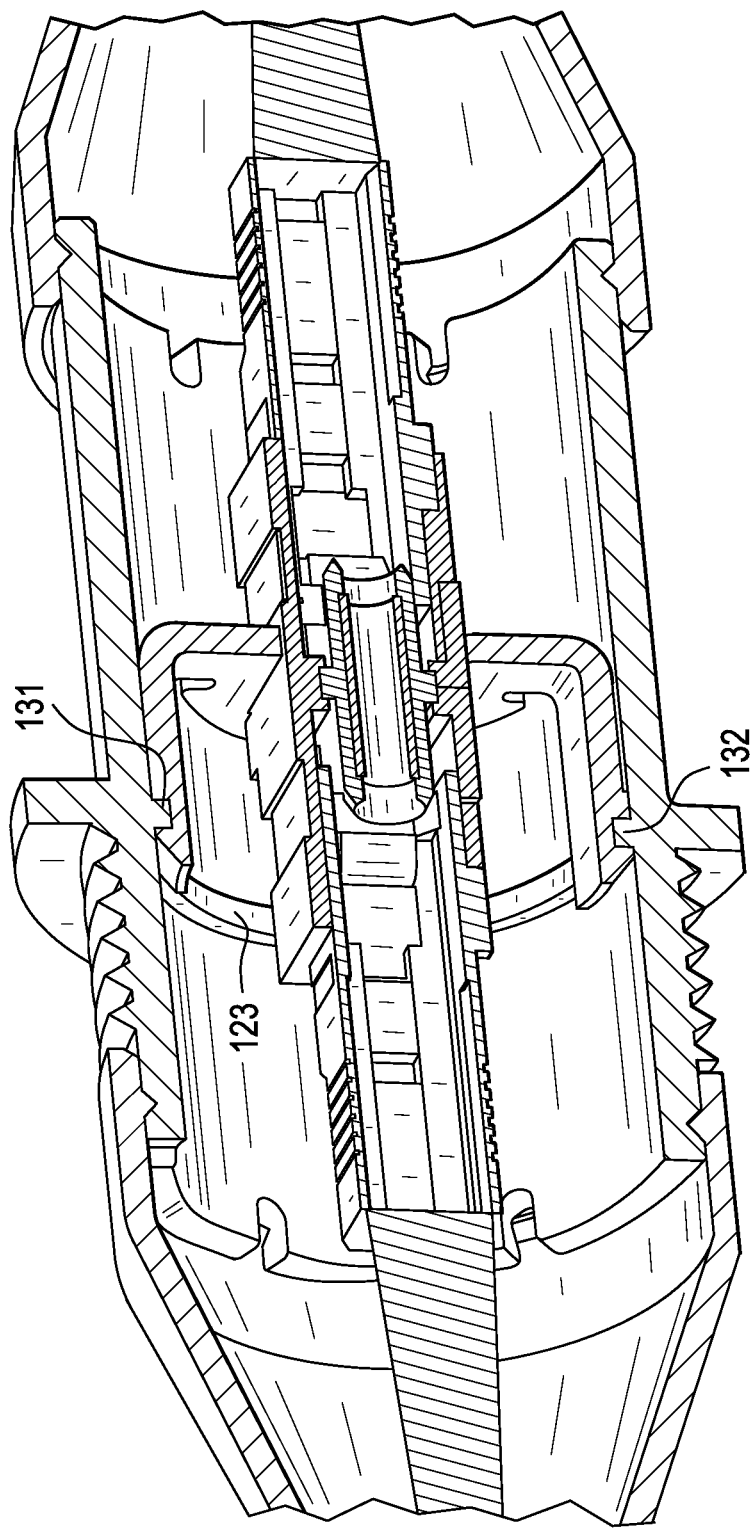
FIG. 5A is a close up of a cross sectional view of an exemplary embodiment of the invention showing two fiber optic connectors with a single adapter in a housing.

FIG. 5A is a close up of a cross sectional view of two fiber optic connectors with a single adapter in a housing. According to an exemplary embodiment, the fiber optic adapter insert 130 includes depressions (131, 132) on its surface that snaps into a protrusion 123 on the inner surface of the connector housing body 120.

Figure 5B:
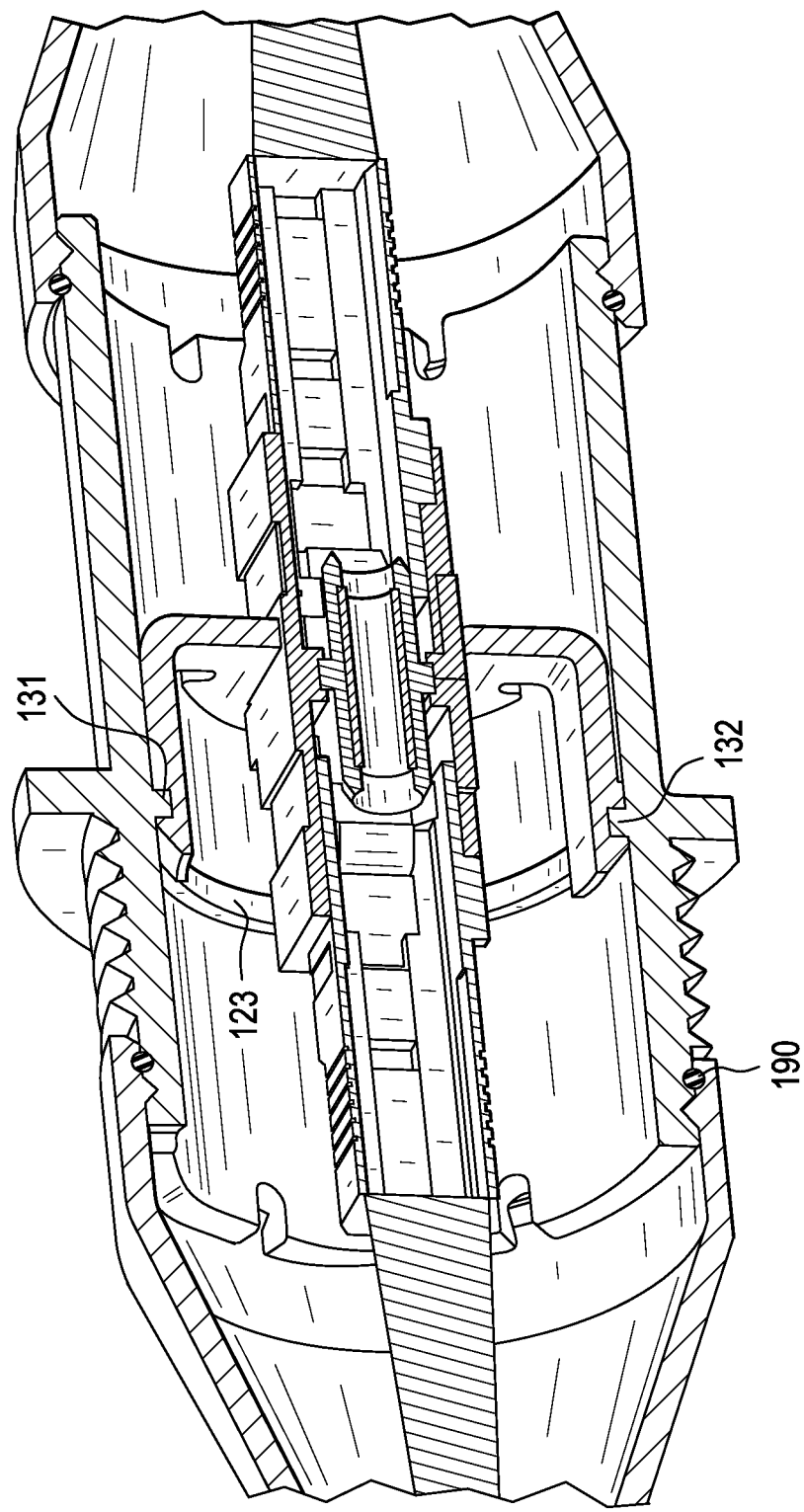
FIG. 5B is a close up of a cross sectional view of an exemplary embodiment of the invention showing two fiber optic connectors with a single adapter in a housing along with O-Rings.

FIG. 5B is a close up of a cross sectional view of two fiber optic connectors with a single adapter in a housing further showing O-Rings. According to an exemplary embodiment, the connector housing body 120 comprises of two grooves which can hold O-Rings 190. On one end of the connector housing body 120, the groove a placed between the connector housing body threads 121 and the interference lip 124/ snap finger 126. On the other end of the connector housing body 120, the groove is placed between the connector housing body shoulder 122 and the interference lip 125/snap finger 127 (closer to the interference lip/snap finger) according to an exemplary embodiment. On connecting the sealing boot with the connector housing body on either side, the O-Ring, along with the connector housing body and the sealing boot, forms another seal.

According to another exemplary embodiment, the grooves may be placed on the interior surface of the sealing boots. Each sealing boot may incorporate a groove on its inner surface between the edge and the interference lip 101, 181/snap fit receiving catch 105, 185. On connecting the sealing boot with the connector housing body on either side, the O-Ring, along with the connector housing body and the sealing boot, forms another seal.

FIG. 6 shows the detail of fiber optic adapter and fiber optic insert. According to an exemplary embodiment, the cutout on the fiber optic adapter insert can be modified to accommodate a variety of fiber optic adaptors like simplex FC, simplex ST, simplex LC, simplex SC simplex MU, duplex LC, duplex MU, and MPO/MTP. The fiber optic adapter insert may be interchangeable and there more be one or more connectors and connector types used according to an exemplary embodiment. The fiber optic adapter insert may also incorporate an anti-rotation key section 133 which locks with a linear rib molded into the inner bore of connector housing body 120 according to an exemplary embodiment.

Figure 7:
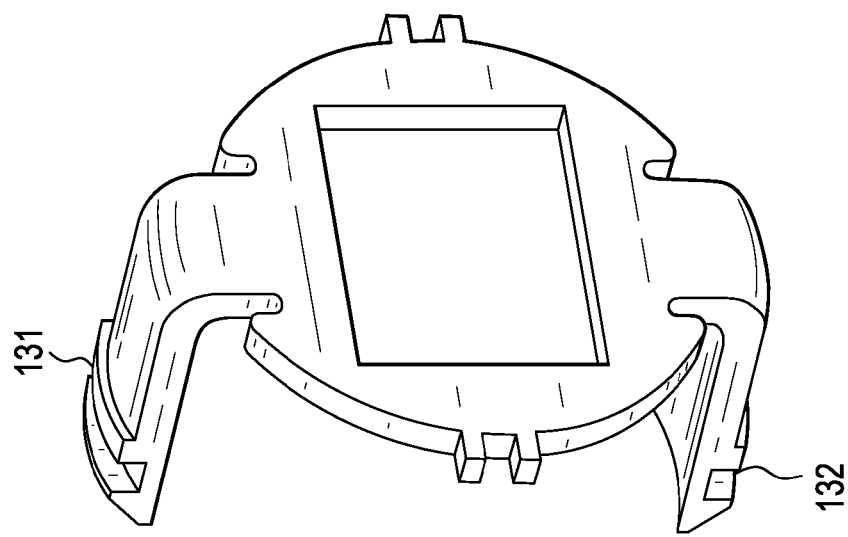
FIG. 7 shows the detail of fiber optic insert according to an exemplary embodiment of the invention.

FIG. 7 shows the detail of fiber optic insert depicting the depressions (131, 132) discussed above, according to an exemplary embodiment.

Figure 8:
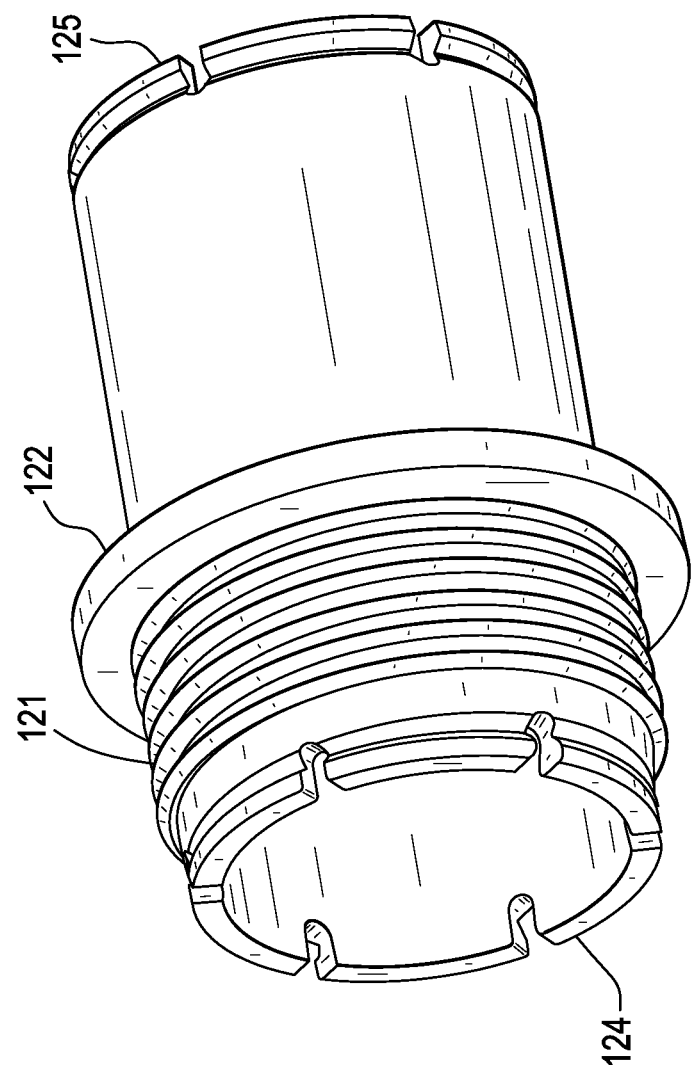
FIG. 8 shows the detail of connector housing body with interface lips according to an exemplary embodiment of the invention.

FIG. 8 shows the detail of connector housing body 120. According to an exemplary embodiment, the connector housing body shoulder 122 and the connector housing body threads 121 allow for the installation of the housing on an enclosure. The exterior edges of the connector housing body include interference lips (124, 125) that share a complementary feature with the interference lip (see description of FIG. 9 below—101, 181) of the sealing boot to create a seal between the sealing boot and the connector housing body according to an exemplary embodiment.

Figure 9:
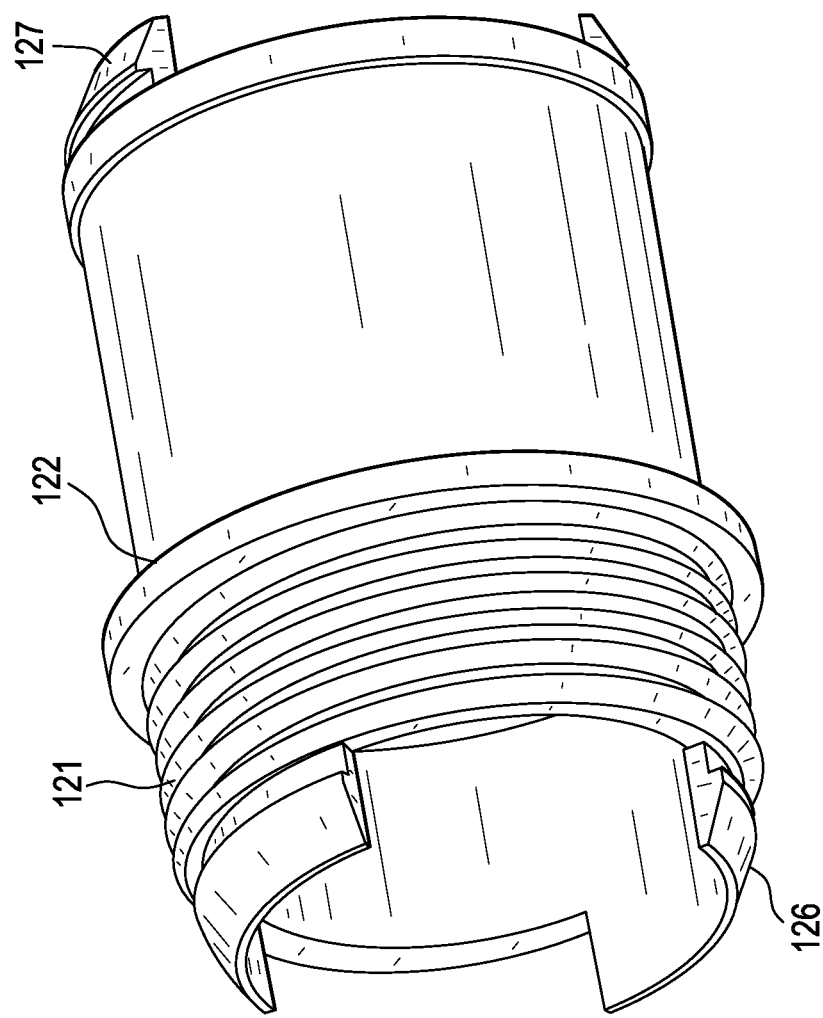
FIG. 9 shows the detail of connector housing body with snap fingers according to an exemplary embodiment of the invention.

FIG. 9 shows the detail of connector housing body 120 according to another exemplary embodiment. According to an exemplary embodiment, the exterior edges of the connector housing body include snap fingers (126, 127) that share a complementary features with the snap fit receiving catch (see description of FIG. 11 below—105, 185) of the sealing boot to retain the sealing boot, ensuring that the sealing boot is held in the optimal position for sealing. If a filed technician desires to access the interior of the connector housing, the technician may depress the snap boots with a tool in order release the sealing boot from the connector housing.

Figure 10:
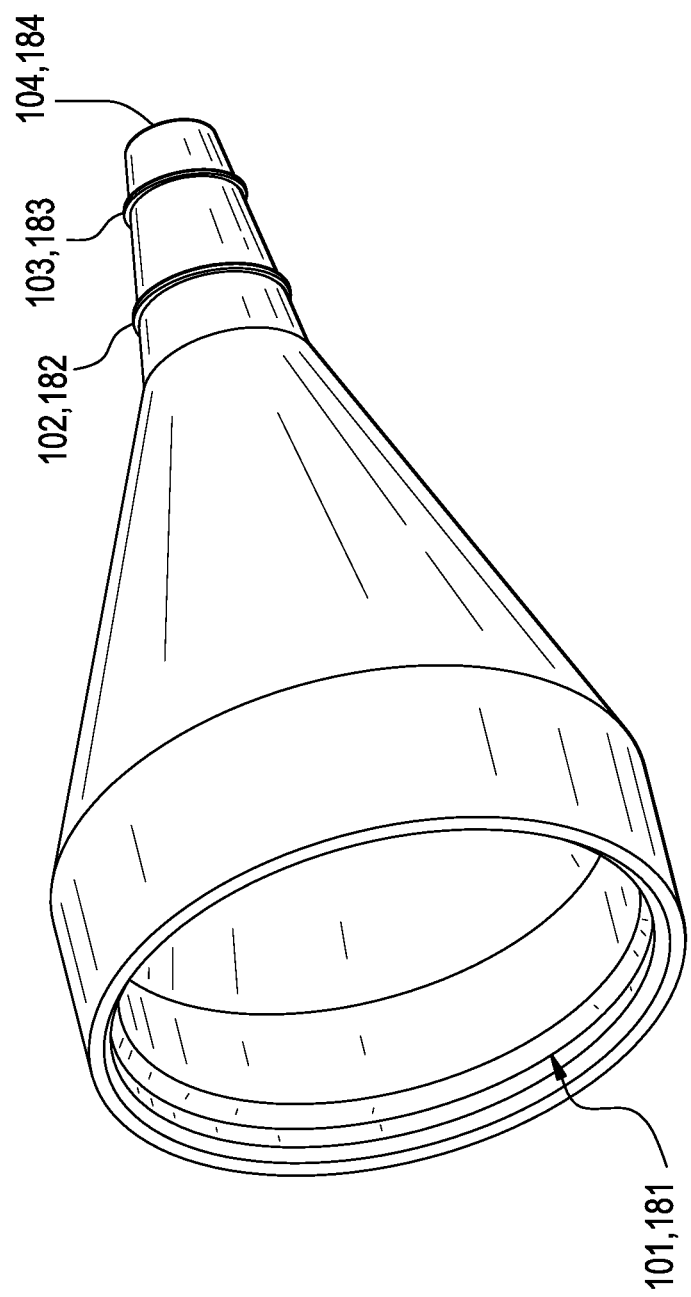
FIG. 10 shows the detail of seal boot with molded/embossed lines and interference lip according to an exemplary embodiment of the invention.

FIG. 10 shows the detail of sealing boot (100, 180). Lines can be molded/embossed onto the tapered section of the sealing boot according to an exemplary embodiment, allowing field personnel to size the boot opening to the cable diameter. FIG. 10 shows line markings for a 3.0 mm diameter cable (102, 182) and for a 4.8 mm diameter cable (103, 183) according to an exemplary embodiment. The line markings could be made for cables of any other diameter and that the lines can me imprinted on the tapered section of the sealing boot by a variety of means other than the ones mentioned above (printed, laser, or other means as required by harsh environments). This facilitates the sealing boot trim operation in the field.

The interference lip (101, 181) of the sealing boot connect with the interference lips (124, 125) of the connector housing body 120 to create a seal between the sealing boot and the connector housing body according to an exemplary embodiment.

Figure 11:
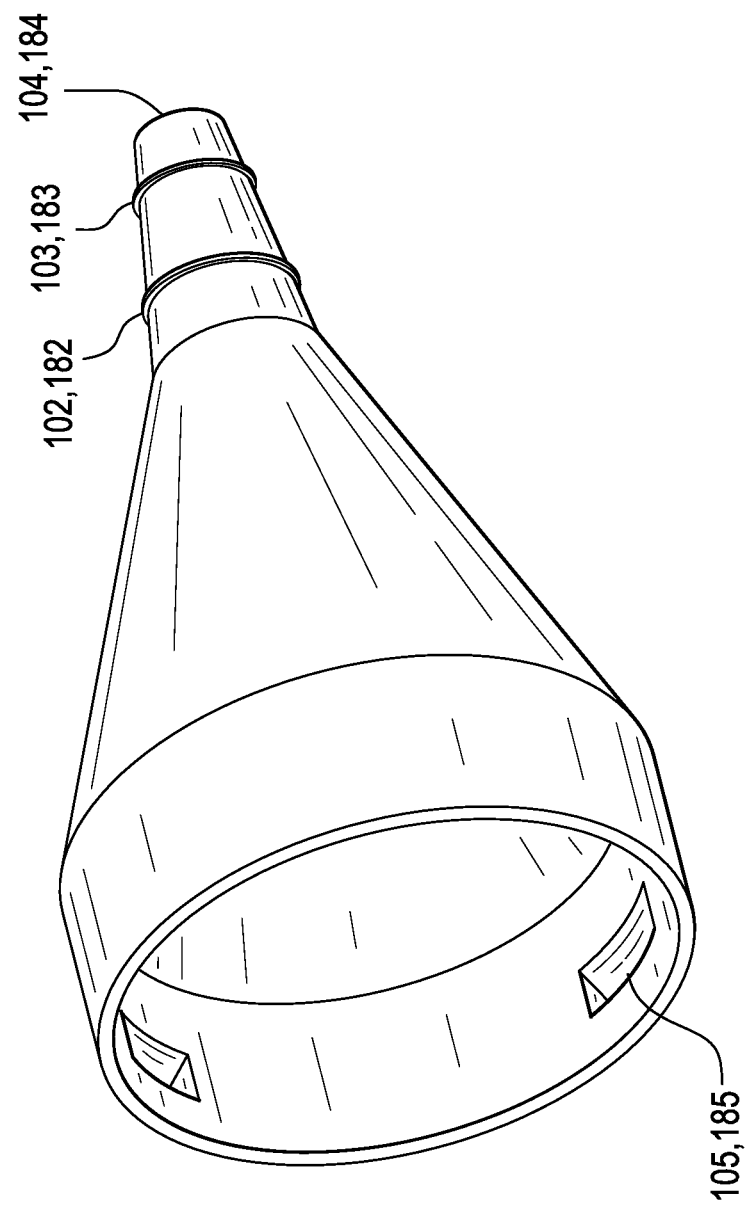
FIG. 11 shows the detail of seal boot with molded/embossed lines and with snap fit receiving catch according to an exemplary embodiment of the invention.

FIG. 11 shows the detail of sealing boot (100, 180) according to another exemplary embodiment. According to an exemplary embodiment, the snap fit receiving catch (105, 185) of the sealing boot connect with the snap fingers (126, 127) of the connector housing body 120 to retain the sealing boot, ensuring that the sealing boot is held in the optimal position for sealing.

Figure 12:
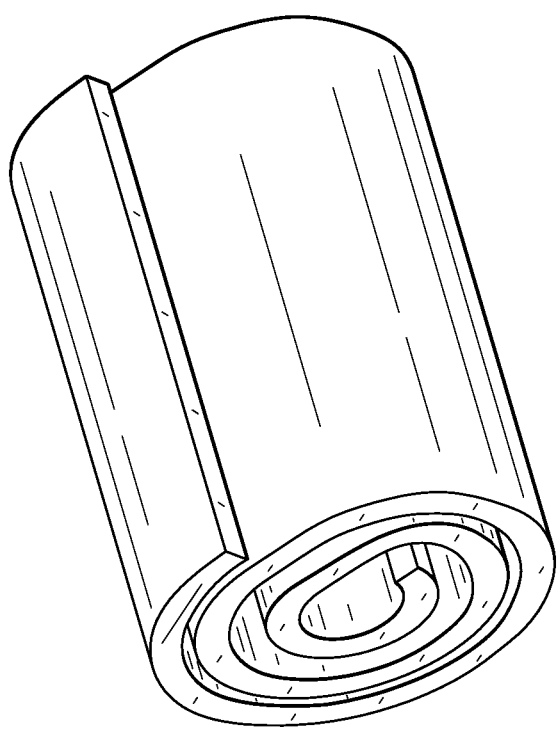
FIG. 12 shows the detail of sealing tape according to an exemplary embodiment of the invention.

As discussed above with reference to FIG. 5, the sealing boots may incorporate a groove (not shown in FIGS. 10 and 11) between the edge and the interference lip 101, 181/snap fit receiving catch 105, 185 and on connecting the sealing boot with the connector housing body on either side, the O-Ring, along with the connector housing body and the sealing boot, forms another seal FIG. 12 shows the detail of an exemplary sealing tape.

As explained above, with reference to the drawings, the exemplary embodiments of the connector housing are compatible with field installable connectors on the market (FAST connector, Fuse Connect, etc.) as well as with commercially available/common fiber optic adapters. The embodiments are further compatible with common cable sizes (2 mm, 3 mm, and 4.8 mm) and can be adapted to other cable types by further adapting the tapered portion of the sealing boot (120, 180).

The connector housing apparatus, according to an exemplary embodiment, can be disassembled and reassembled. The connector housing apparatus can further be mounted to a bulkhead in a single or a gang mounted manner according to another exemplary embodiment.

The above described connector housing can be applied to simplex, duplex, and multifiber connectors. The above described embodiments of the connector housing can be configured in the field by changing fiber optic adapter insert 130 and/or trimming the tapered portion of the sealing boot (120, 180) to match the cable diameter. Furthermore, it can be installed in field with minimal tools and no electrical power and thus, leads to low cost.

As mentioned above, the embodiments described above are merely exemplary and the general inventive concept should not be limited thereto. While this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

What is claimed is:

1. A connector housing apparatus comprising:
a connector housing body;
a first sealing boot;
a second sealing boot;
a fiber optic adapter configured to connect to a first fiber optic pigtail and a second fiber optic pigtail; and
a fiber optic adapter insert that holds the fiber optic adapter, wherein,
the first sealing boot and the second sealing boot are connected to the connector body housing at opposite ends of the connector housing body such that the entire fiber optic adapter and entire fiber optic adapter insert are completely sealed within the connector housing body.

2. The connector housing apparatus of claim 1, further comprising:
a first sealing element; and
a second sealing element; wherein,
a first fiber optic cable connected to the first fiber optic pigtail, the first sealing element and a tapered section of the first sealing boot form a first seal, and
a second fiber optic cable connected to the second fiber optic pigtail, the second sealing element and a tapered section of the second sealing boot form a second seal.

3. The connector housing apparatus of claim 2, wherein,
the connector housing body comprises a first interface lip and a second interface lip at its opposite ends,
the first sealing boot comprises an interface lip,
the second sealing boot comprises an interface lip,
the first interface lip of the connecter housing body and the interface lip of the first sealing boot are connected to form a third seal; and
the second interface lip of the connecter housing body and the interface lip of the second sealing boot are connected to form a fourth seal.

4. The connector housing apparatus of claim 2, wherein,
the connector housing body comprises a first snap finger and a second snap at its opposite ends,
the first sealing boot comprises a snap fit receiving catch,
the second sealing boot comprises a snap fit receiving catch,
the first snap finger of the connecter housing body and the snap fit receiving catch of the first sealing boot are connected to form a third seal; and
the second snap finger of the connecter housing body and the snap fit receiving catch of the second sealing boot are connected to form a fourth seal.

5. The connector housing apparatus of claim 1, wherein the connector housing body comprises a connector housing body shoulder and connector housing body threads allowing for installation of the connector housing apparatus on an enclosure.

6. The connector housing apparatus of claim 5, further comprising a locking nut, wherein, when the first sealing boot is removed, the connector housing apparatus can be mounted onto an exterior surface of the enclosure using the locking nut.

7. The connector housing apparatus of claim 1, wherein the fiber optic adapter insert comprises a depression on its surface which snaps into a protrusion on the inner surface of the connector housing body.

8. The connector housing apparatus of claim 1, wherein, the fiber optic adapter insert comprises a cutout which can be modified to accommodate a variety of fiber optic adapters,
the fiber optic adapter insert cutout can be modified to accommodate one or more adapters, and
the fiber optic adapter insert comprises an anti rotation key section which locks with a linear rib molded into inner bore of the connector housing body.

9. The connector housing apparatus of claim 8, wherein the variety of fiber optic adapters is one of a simplex FC, simplex ST, simplex LC, simplex SC, simplex MU, duplex LC, duplex MU, and MPO/MTP adapter.

10. The connector housing apparatus of claim 1, wherein the tapered section of the first sealing boot and the tapered section of the second sealing boot comprise line markings allowing for a user to size the opening of the first sealing boot and the second sealing boot according to the diameter of a first fiber optic cable and a second fiber optic cable respectively.

11. The connector housing apparatus of claim 2, wherein the first sealing element and the second sealing element are at least one of b-sealing tape, closed cell foam tape, compressible elastomer and molded grommet.

12. The connector housing apparatus of claim 1, wherein,
the first sealing boot forms a seal which protects against the effect of immersion in a liquid to a depth of up to 1 m, and
the second sealing boot forms a seal which protects against the effect of immersion in a liquid to a depth of up to 1 m.

13. The connector housing apparatus of claim 5, wherein the connector housing body shoulder and the connector housing body are sized to fit National Pipe Taper (NPT) port sizes.

14. The connector housing apparatus of claim 1, wherein,
the first fiber optic pigtail comprises a fiber optic connector body and a fiber optic connector boot,
the second fiber optic pigtail comprises a fiber optic connector body and a fiber optic connector boot, and
the fiber optic connector body of the first fiber optic pigtail and the fiber optic connector body of the second fiber optic pigtail are connected with the fiber optic adapter.

15. The connector housing apparatus of claim 1, further comprising:
a first O-Ring; and
a second O-Ring, wherein,
the connector housing body comprises a first groove which holds the first O-Ring and a second groove which holds the second O-Ring,
when the first sealing boot is connected to the connector housing body, the first sealing boot, the first O-Ring and the connector housing body form a seal, and
when the second sealing boot is connected to the connector housing body, the second sealing boot, the second O-Ring and the connector housing body form a seal.

16. The connector housing apparatus of claim 1, further comprising:
a first O-Ring; and
a second O-Ring, wherein,
the first sealing boot comprises a first groove on its interior surface which holds the first O-Ring,
the second sealing boot comprises a second groove on its interior surface which holds the second O-Ring,
when the first sealing boot is connected to the connector housing body, the first sealing boot, the first O-Ring and the connector housing body form a seal, and
when the second sealing boot is connected to the connector housing body, the second sealing boot, the second O-Ring and the connector housing body form a seal.

17. The connector housing apparatus of claim 1, wherein the connector housing apparatus can be disassembled and reassembled.

18. The connector housing apparatus of claim 1, wherein the connector housing apparatus can be mounted to a bulkhead in at least one of a single and gang mounted manner.

* * * * *